(12) United States Patent
Oda et al.

(10) Patent No.: US 7,719,609 B2
(45) Date of Patent: May 18, 2010

(54) FOLDABLE PORTABLE INSTRUMENT WITH CAMERA

(75) Inventors: Hirofumi Oda, Higashihiroshima (JP); Kimiaki Imai, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 936 days.

(21) Appl. No.: 10/866,712

(22) Filed: Jun. 15, 2004

(65) Prior Publication Data

US 2004/0252220 A1 Dec. 16, 2004

(30) Foreign Application Priority Data

Jun. 16, 2003 (JP) ............... 2003-170597

(51) Int. Cl.
*H04N 5/225* (2006.01)
(52) U.S. Cl. ............... 348/373; 455/556.1; 455/556.2; 455/566; 455/575.1; 455/575.3; 455/575.4
(58) Field of Classification Search ............ 348/373; 455/90.1, 90.2, 550.1, 556.1, 556.2, 566, 455/575.1, 575.3, 575.4
See application file for complete search history.

(56) References Cited

U.S. PATENT DOCUMENTS

| | | | | |
|---|---|---|---|---|
| 5,612,732 | A * | 3/1997 | Yuyama et al. | 348/14.01 |
| 6,177,950 | B1 * | 1/2001 | Robb | 348/14.01 |
| 6,466,202 | B1 * | 10/2002 | Suso et al. | 345/169 |
| 6,549,237 | B1 * | 4/2003 | Inuma et al. | 348/333.06 |
| 7,173,665 | B2 * | 2/2007 | Kawasaki et al. | 348/376 |
| 2002/0065102 | A1 | 5/2002 | Miyake et al. | |
| 2002/0067426 | A1 * | 6/2002 | Nagata et al. | 348/373 |
| 2003/0040346 | A1 | 2/2003 | Fukuda et al. | |

FOREIGN PATENT DOCUMENTS

| | | |
|---|---|---|
| FR | 2818480 | 6/2002 |
| JP | 2001-136254 A | 5/2001 |
| JP | 2001-320463 A | 11/2001 |
| JP | 2002-171322 A | 6/2002 |
| JP | 2002-300237 A | 10/2002 |
| JP | 2002-374434 A | 12/2002 |
| JP | 2003-110895 A | 4/2003 |
| JP | 2003-152848 A | 5/2003 |
| JP | 2004-147134 A | 5/2004 |

* cited by examiner

*Primary Examiner*—Sinh Tran
*Assistant Examiner*—Anthony J Daniels
(74) *Attorney, Agent, or Firm*—Birch, Stewart, Kolasch & Birch, LLP (57) ABSTRACT

A foldable portable instrument with camera includes a first housing and a second housing connected in a foldable manner, a main display portion provided in the first housing, and a camera provided in the second housing. The camera is attached to the second housing such that a perpendicular direction with respect to a display surface of main display portion and an optical axis direction of the camera are identical when the first housing and the second housing are in an opened state. Accordingly, a foldable portable instrument with camera allowing natural image pick-up and directing the camera to a subject in a facilitated manner with a simplified configuration, when an image is picked up by the camera while it is monitored on the display portion, is obtained.

11 Claims, 6 Drawing Sheets

FIG.6

FOLDABLE PORTABLE INSTRUMENT WITH CAMERA

This nonprovisional application is based on Japanese Patent Application No. 2003-170597 filed with the Japan Patent Office on Jun. 16, 2003, the entire contents of which are hereby incorporated by reference.

BACKGROUND OF THE INVENTION

1. Field of the Invention

The present invention relates to a foldable portable instrument with camera, and more particularly to a foldable portable instrument with camera having a first housing and a second housing connected in a foldable manner.

2. Description of the Background Art

A number of portable communication instruments equipped with a camera and communicating an image picked up by the camera have been proposed.

Japanese Patent Laying-Open No. 2001-136254 discloses a portable radio communication device implemented by connecting a first housing with a speaker to a second housing with a microphone in a foldable manner and by connecting the second housing to a third housing with a camera by means of a universal joint in a 360° rotatable and foldable manner. When voice communication is established simultaneously with image communication with this portable radio communication device, the third housing is turned with respect to the second housing so that an image captured by the camera can be changed while maintaining a posture suitable for communication. In addition, when a body of the portable radio communication device is stored, the first housing and the third housing are folded toward the second housing, so that a screen of a display portion and a lens of the camera can be protected.

Japanese Patent Laying-Open No. 2001-320463 discloses a portable terminal device in which a lid portion is foldable and pivotable with respect to a body of a housing. In this portable terminal device, a display device provided in the lid portion is turned with respect to an image pick-up camera fixed on a back face or a side face of the housing body depending on a condition of image pick-up. Accordingly, an image to be picked up can be monitored on the display device both in image pick-up of a user him/herself and in image pick-up of an external subject with the image pick-up camera.

On the other hand, though the camera can be directed to desired, various directions by providing a universal joint and turning the camera and the camera lens can be protected by folding the three housings according to Japanese Patent Laying-Open No. 2001-136254, the number of parts has increased due to presence of the third housing and the universal joint. In addition, a signal should be transmitted from the camera to the second housing. Considering these facts, the cost increase is inevitable.

In Japanese Patent Laying-Open No. 2001-320463, a mechanism including a pipe for turning the lid portion is required, which will also lead to cost increase.

SUMMARY OF THE INVENTION

The present invention was made in view of the above-described problems. An object of the present invention is to provide a foldable portable instrument with camera allowing natural image pick-up and directing the camera to a subject in a facilitated manner with a simplified configuration, when an image is picked up by the camera with a display portion being monitored.

According to the present invention, a foldable portable instrument with camera includes a first housing and a second housing connected in a foldable manner; a display portion provided in the first housing; and a camera provided in the second housing. The camera is attached to the second housing such that a perpendicular direction with respect to a display surface of the display portion and an optical axis direction of the camera are identical when the first housing and the second housing are in an opened state.

According to the foldable portable instrument with camera of the present invention, a perpendicular direction with respect to the display surface of the display portion and the optical axis direction of the camera are identical when the first housing and the second housing are in an opened state. Therefore, when the display portion is viewed perpendicularly for picking up an image of a user him/herself, the camera is directed to the user substantially perpendicularly, whereby natural image pick-up is allowed.

In addition, when an image of a subject other than the user him/herself is picked up, the direction in which the display portion faces is the direction of the camera. Therefore, the camera can be directed to the subject in a facilitated manner with the display portion being monitored, whereby directing to the subject is facilitated.

Moreover, it is not necessary to turn the camera with respect to the housing in order to achieve the above-described effect. That is, a mechanism for turning the camera is no longer necessary and the number of parts for such a mechanism can be decreased, thereby avoiding cost increase.

Preferably, in the foldable portable instrument with camera, the camera is arranged in the second housing such that the camera is located on an inner side of the foldable portable instrument with camera when the first housing and the second housing are closed.

Accordingly, when the display portion is viewed perpendicularly for picking up an image of the user him/herself, the camera is directed to the user substantially perpendicularly, whereby natural image pick-up is allowed.

Preferably, in the foldable portable instrument with camera, the camera is arranged in the second housing such that the camera is located on an outer side of the foldable portable instrument with camera when the first housing and the second housing are closed.

Accordingly, when an image of a subject other than the user him/herself is picked up, the direction in which the display portion faces is the direction of the camera. Therefore, the camera can be directed to the subject in a facilitated manner with the display portion being monitored, whereby directing to the subject is facilitated.

DESCRIPTION OF THE PREFERRED EMBODIMENTS

In the following, embodiments of the present invention will be described with reference to the figures.

First Embodiment

Figure 1:
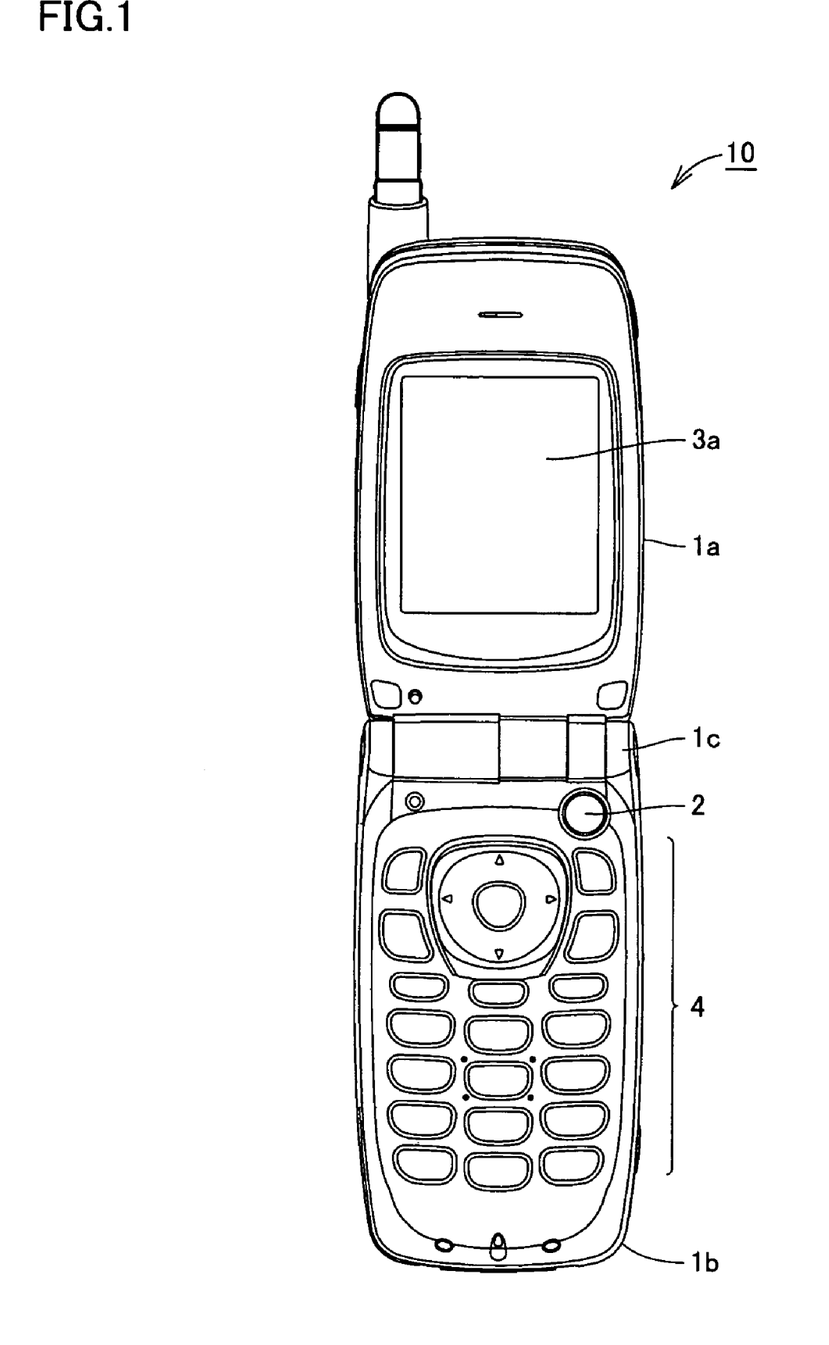
FIG. 1 is a front view of a foldable portable instrument with camera in an opened state in a first embodiment of the present invention.
Figure 2:
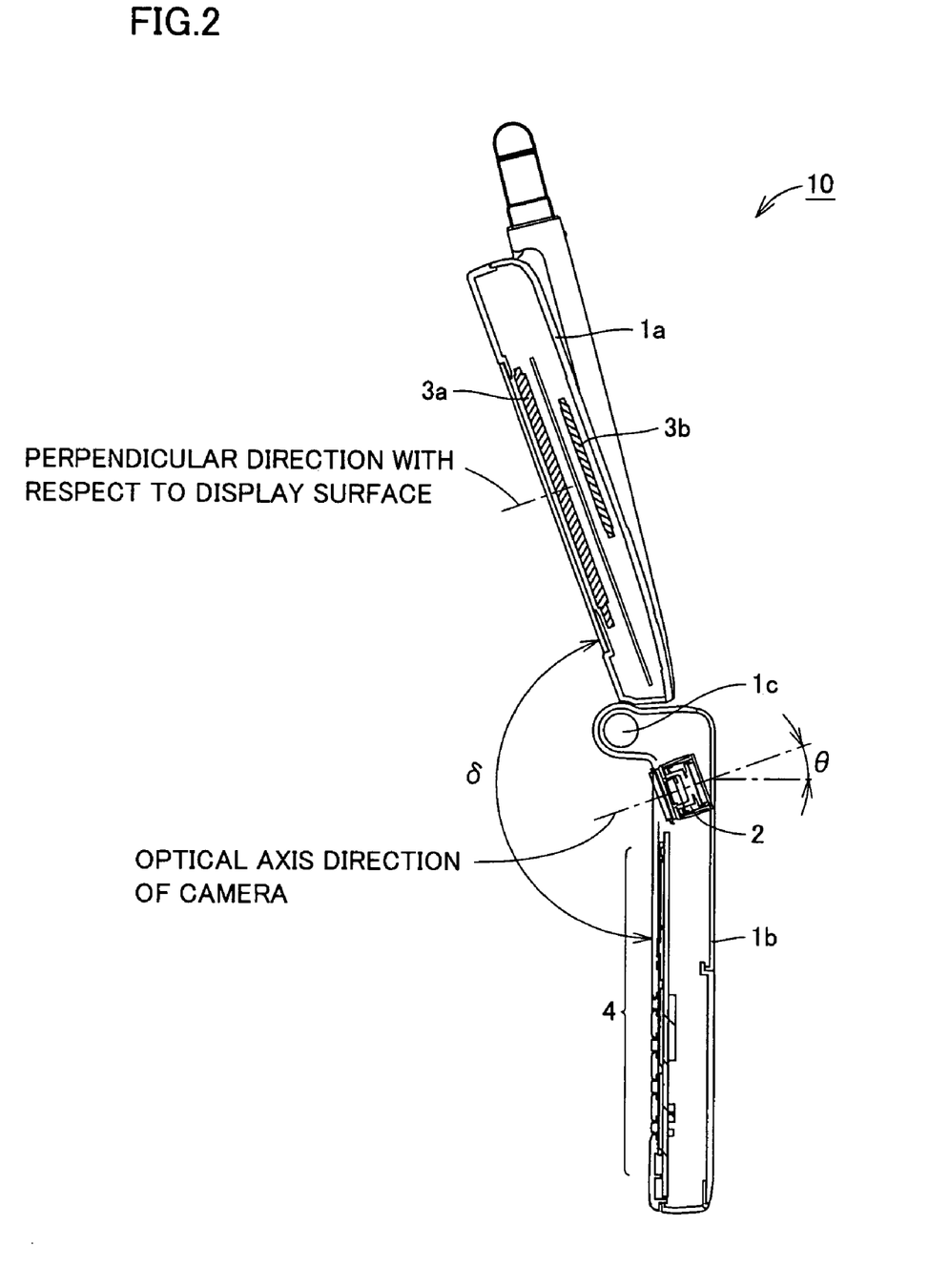
FIG. 2 is a partial cross-sectional side view of the foldable portable instrument with camera in an opened state in the first embodiment of the present invention, illustrating a first housing and a second housing in cross-section.

Referring to FIGS. 1 and 2, a foldable portable instrument with camera 10 in the present embodiment mainly includes a first housing 1a, a second housing 1b, a hinge portion 1c, a camera 2, a main display portion 3a, a sub display portion 3b, and a plurality of input buttons 4.

First housing 1a and second housing 1b are connected by hinge portion 1c so as to implement a foldable structure. Main display portion 3a displaying input characters or a picked-up image is arranged on one surface side (surface side) of first housing 1a, while sub display portion 3b displaying a charge status, a radio wave status or the time in a folded state is arranged on the other surface side (back face side). In addition, camera 2 and the plurality of input buttons 4 are arranged on one surface side (surface side) of second housing 1b, while a battery cover and the like are arranged on the other surface side (back face side). The plurality of input buttons 4 include buttons for input of characters or a button for triggering the shutter.

When first housing 1a and second housing 1b are folded (closed), camera 2, main display portion 3a and the plurality of input buttons 4 are located on an inner side while sub display portion 3b and the battery cover are located on an outer side. Therefore, in the folded state, though sub display portion 3b and the battery cover can visually be recognized externally, camera 2, main display portion 3a and the plurality of input buttons 4 cannot visually be recognized.

When first housing 1a and second housing 1b are in an opened state, an angle δ between first housing 1a and second housing 1b is approximately 160°. Meanwhile, camera 2 is attached to second housing 1b such that an optical axis direction of camera 2 is tilted by an angle θ of 20° with respect to a perpendicular to the surface or the back surface of second housing 1b, that is, such that a perpendicular direction with respect to the display surface of main display portion 3a and the optical axis direction of camera 2 are identical when first housing 1a and second housing 1b are in an opened state.

Figure 3:
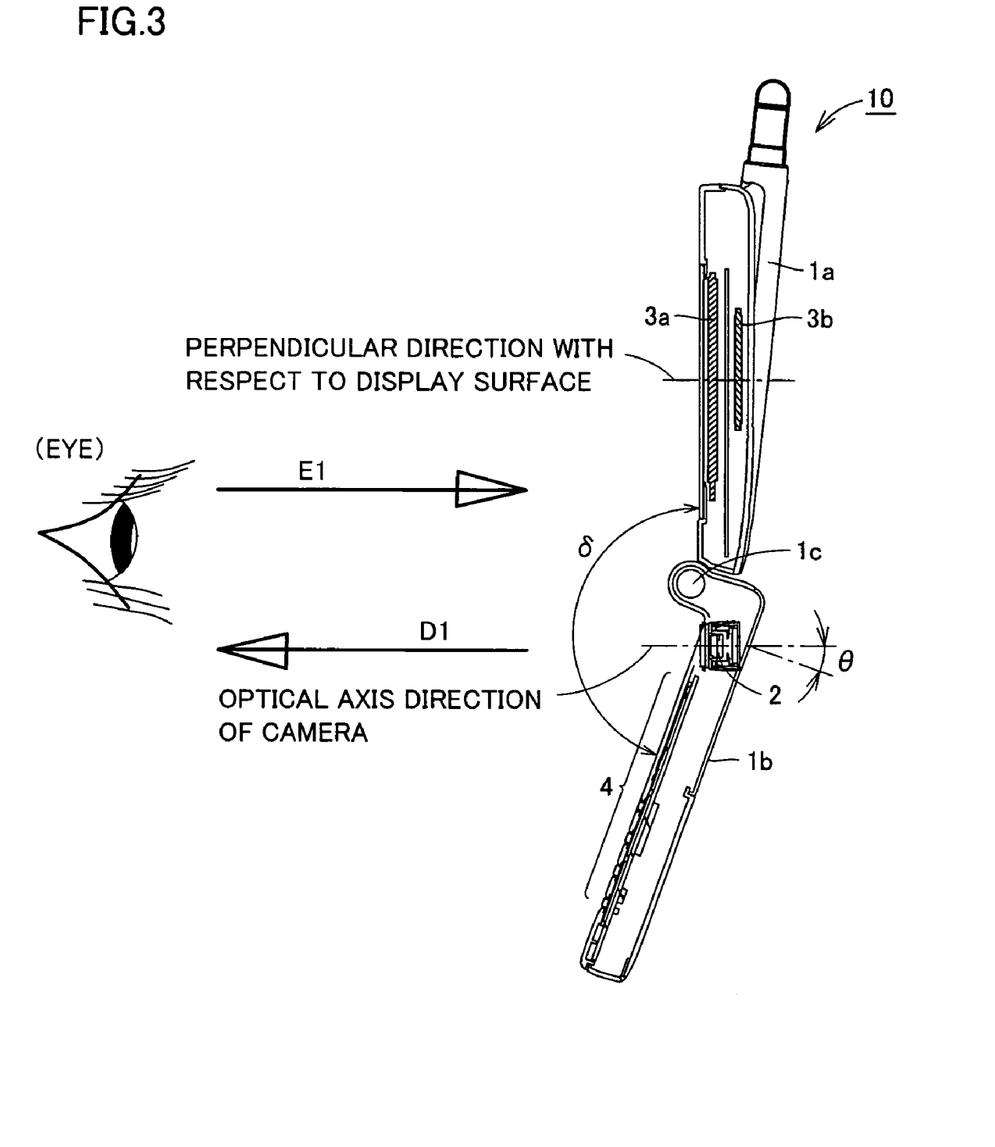
FIG. 3 illustrates a positional relation of a display portion and a camera in the foldable portable instrument with camera shown in FIGS. 1 and 2 and an eye of an operator.

According to the present embodiment, camera 2 is fixed to second housing 1b always with a prescribed tilt (angle θ). Therefore, the perpendicular direction with respect to the display surface of main display portion 3a and the optical axis direction of camera 2 can be identical when first housing 1a and second housing 1b are in an opened state. In this manner, as shown in FIG. 3, when main display portion 3a is viewed perpendicularly for picking up an image of the user him/herself, camera 2 is directed to the user substantially perpendicularly. In other words, the camera substantially faces the user and the user's eyes also look in the front direction, whereby natural image pick-up is allowed.

In addition, as camera 2 is arranged in second housing 1b not in first housing 1a, the following effect can be obtained.

In foldable portable instrument with camera 10, a size of a display screen in main display portion 3a and sub display portion 3b provided in first housing 1a tends to be increasingly larger. Accordingly, it is more advantageous to provide camera 2 in second housing 1b rather than in first housing 2a, considering a space occupied by the camera. In addition, if camera 2 is arranged on a side opposite to sub display portion 3b, that is, on the back face of second housing 1b, sub display portion 3b on the back side of first housing 1a can be used as a finder when the foldable portable instrument with camera is used as a camera in the folded state.

Second Embodiment

Figure 4:
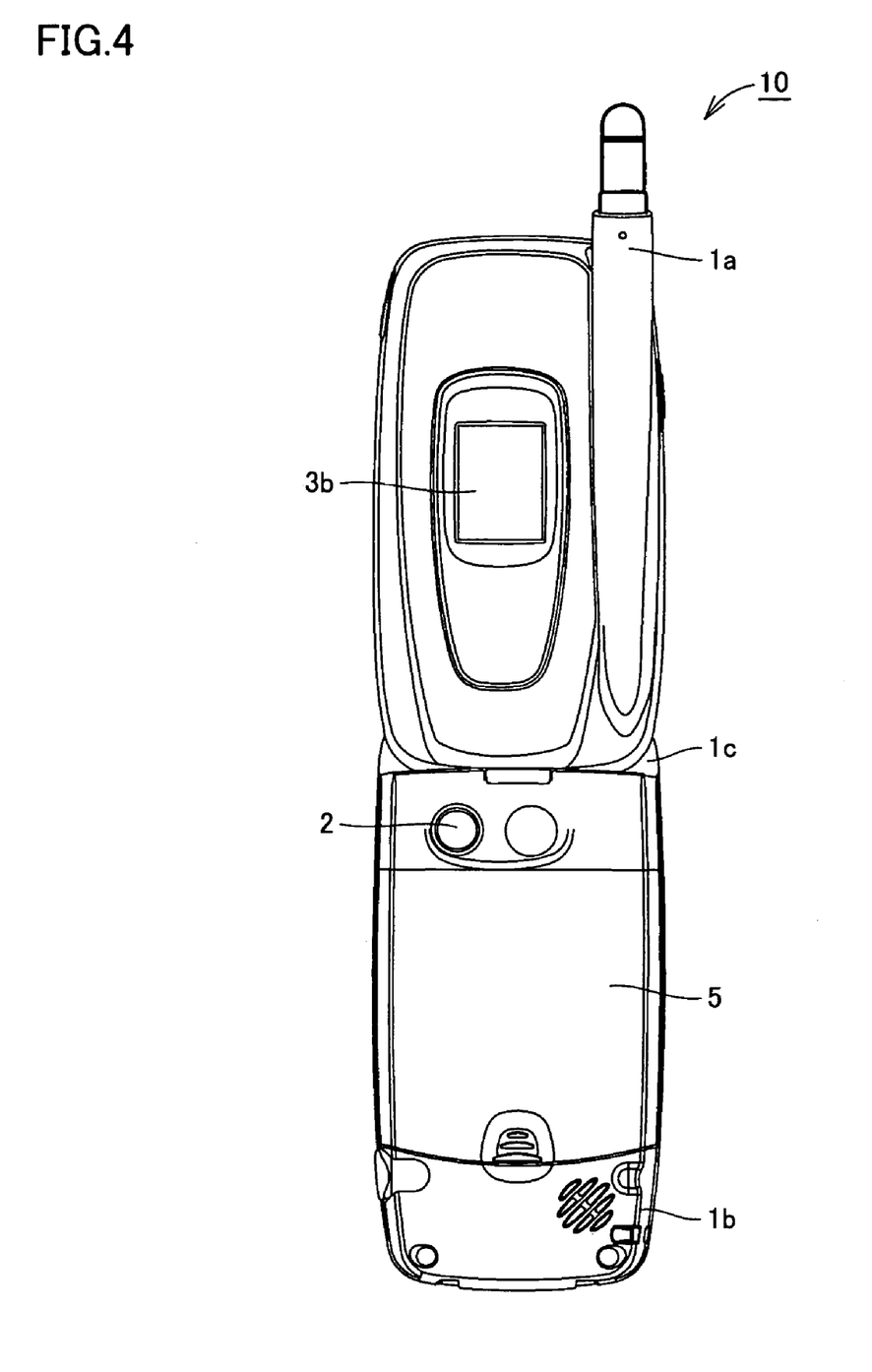
FIG. 4 is a rear view of a foldable portable instrument with camera in an opened state in a second embodiment of the present invention.
Figure 5:
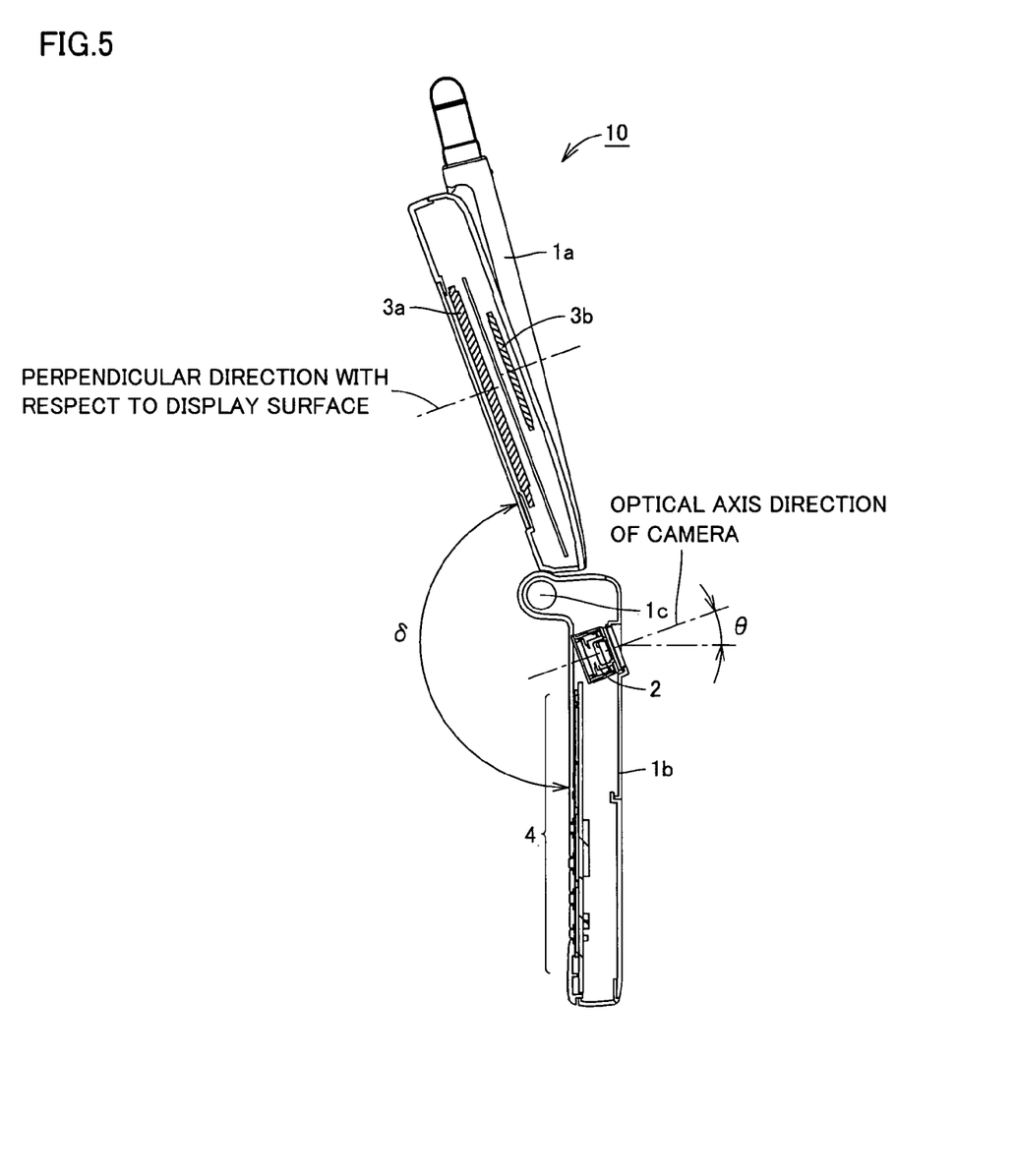
FIG. 5 is a partial cross-sectional side view of the foldable portable instrument with camera in an opened state in the second embodiment of the present invention, illustrating a first housing and a second housing in cross-section.

Referring to FIGS. 4 and 5, a configuration of foldable portable instrument with camera 10 in the present embodiment is different from that in the first embodiment in that camera 2 is arranged on the other surface side (back face side) of second housing 1b.

On the back side of second housing 1b, camera 2 is arranged closer to hinge portion 1c, rather than on a side of battery cover 5, for example.

When first housing 1a and second housing 1b are folded (closed), main display portion 3a and the plurality of input buttons 4 are located on the inner side, while camera 2, sub display portion 3b and the battery cover are located on the outer side. Therefore, in the folded state, camera 2, sub display portion 3b and the battery cover can visually be recognized externally, whereas main display portion 3a and the plurality of input buttons 4 cannot visually be recognized.

When first housing 1a and second housing 1b are in an opened state, an angle δ between first housing 1a and second housing 1b is approximately 160°. Meanwhile, camera 2 is attached to second housing 1b such that the optical axis direction of camera 2 is tilted by an angle θ of 20° with respect to the perpendicular to the surface or the back surface of second housing 1b, that is, such that a perpendicular direction with respect to the display surface of main display portion 3a and the optical axis direction of camera 2 are identical when first housing 1a and second housing 1b are in an opened state. It is noted here that the optical axis direction of camera 2 is toward the back face side of second housing 1b.

As the configuration is otherwise substantially the same as that in the first embodiment described above, the same reference characters are given to the same or corresponding components and description thereof will not be repeated.

Figure 6:
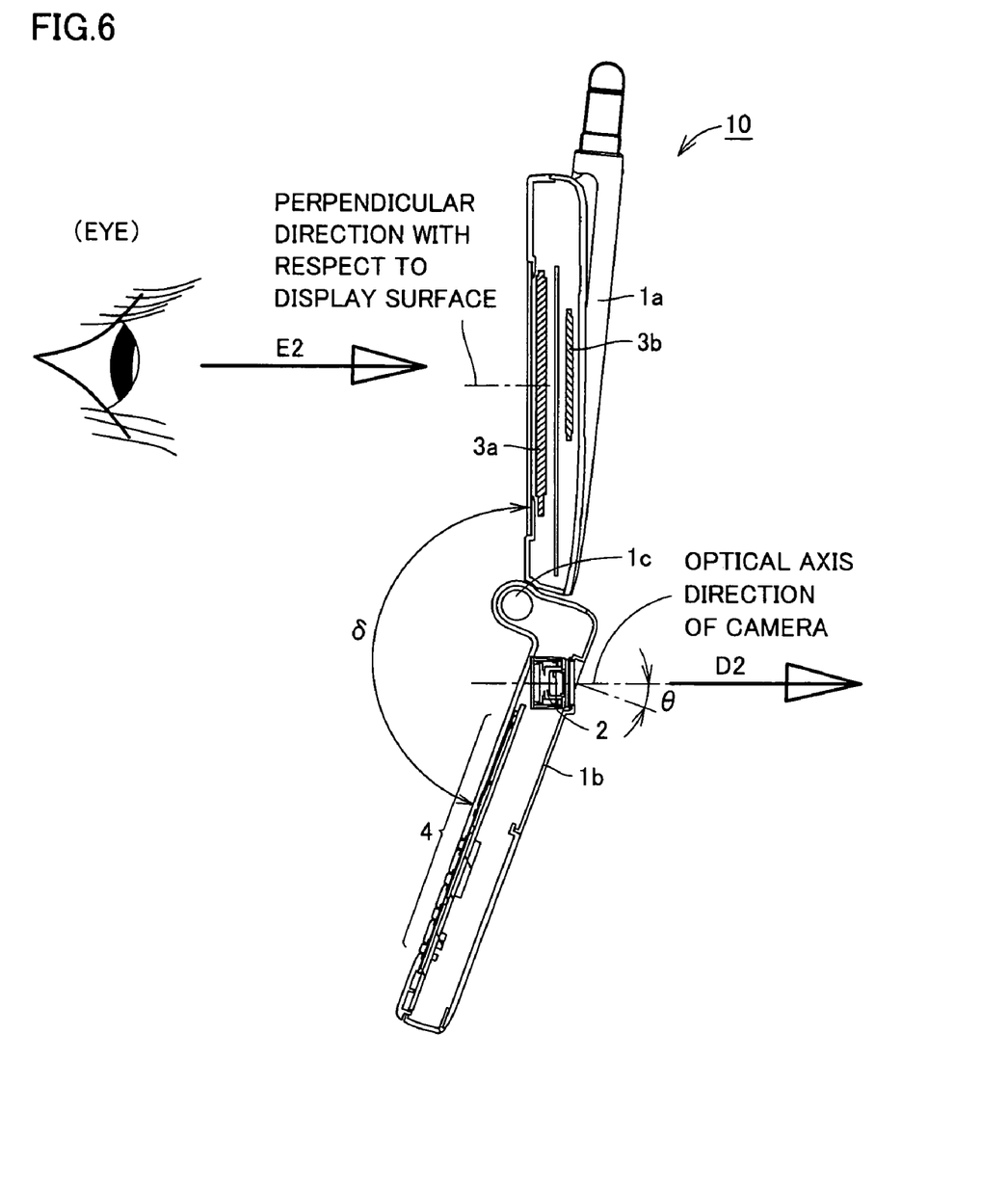
FIG. 6 illustrates a positional relation of a display portion and a camera in the foldable portable instrument with camera shown in FIGS. 4 and 5 and an eye of an operator.

According to the present embodiment, camera 2 is fixed to second housing 1b always with a prescribed tilt (angle θ). Therefore, the perpendicular direction with respect to the display surface of main display portion 3a and the optical axis direction of camera 2 can be identical when first housing 1a and second housing 1b are in an opened state. In this manner, as shown in FIG. 6, when an image of the subject other than the user him/herself is picked up, the direction in which main display portion 3a faces is the direction of camera 2. Accordingly, camera 2 can readily be directed to the subject by the user with main display portion 3a being monitored, whereby directing to the subject is facilitated. In addition, the subject can readily be located by viewing main display portion 3.

Moreover, as camera 2 is arranged in second housing 1b not in first housing 1a, an effect the same as in the first embodiment can be obtained.

In the embodiment described above, a portable telephone has been described as an example of foldable portable instrument with camera 10. The present invention, however, is applicable not only to the portable telephone but also to portable communication instruments. Namely, the present invention is extensively applicable to foldable portable instruments with camera such as a portable information terminal (PDA personal data assistant) or a notebook personal computer.

As described above, according to the foldable portable instrument with camera of the present invention, the perpendicular direction with respect to the display surface of the display portion and the optical axis direction of the camera are identical when the first housing and the second housing are in an opened state. Therefore, when the display portion is viewed perpendicularly for picking up an image of the user him/herself, the camera is directed to the user substantially perpendicularly, whereby natural image pick-up is allowed.

In addition, when an image of the subject other than the user him/herself is picked up, the direction in which the display portion faces is the direction of the camera. Therefore, the camera can be directed to the subject in a facilitated manner with the user viewing the display portion, whereby directing to the subject is facilitated.

Moreover, it is not necessary to turn the camera with respect to the housing in order to achieve the above-described effect. That is, a mechanism for turning the camera is no longer necessary and the number of parts for such a mechanism can be decreased, thereby avoiding cost increase.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A foldable portable instrument with camera, comprising:
    a first housing and a second housing connected in a foldable manner, said first housing having an inner side of the exterior of the first housing and an outer side of the exterior of the first housing, said inner side of the first housing facing substantially opposite from said outer side of the first housing, said second housing having an inner side of the exterior of the second housing and an outer side of the exterior of the second housing, said inner side of the second housing facing substantially opposite from said outer side of the second housing, said inner side of the first housing and said inner side of the second housing facing each other and together constituting an inner side of the foldable portable instrument when said first and second housings are in a folded state, the inner side of the first housing forming an obtuse angle with respect to the inner side of the second housing in the unfolded state;
    a display portion provided in said inner side of said first housing; and
    a camera fixedly provided in said second housing such that an optical axis of the camera may not change with respect to any portion of said second housing; wherein
    said camera is attached to said second housing such that a perpendicular direction with respect to a display surface of said display portion and an optical axis direction of said camera are parallel when said first housing and said second housing are in an opened state,
    a perpendicular direction with respect to said inner side of the second housing and the optical axis direction of said camera form an acute angle therebetween, and
    when the first housing and the second housing are in the folded state, the display portion is located on the inner side of the foldable portable instrument.

2. The foldable portable instrument with camera according to claim 1, wherein
    said camera is arranged in said second housing such that said camera is located on said inner side of the foldable portable instrument with camera when said first housing and said second housing are in the folded state.

3. The foldable portable instrument with camera according to claim 1, wherein
    said camera is arranged in said second housing such that said camera is located on said outer side of the second housing when said first housing and said second housing are in the folded state, and
    said camera and said display surface face in opposite directions when said first housing and said second housing are in the unfolded state.

4. The foldable portable instrument with camera according to claim 1, further comprising:
    a second display portion, located on said outer side of the first housing.

5. The foldable portable instrument with camera according to claim 1, further comprising:
    a plurality of input buttons disposed on said inner side of the second housing and facing the display portion in the folded state.

6. A portable clamshell instrument with camera, comprising:
    a first housing and a second housing connected in a foldable manner, said first housing having an inner side of the exterior of the first housing and an outer side of the exterior of the first housing, said inner side of the first housing facing substantially opposite from said outer side of the first housing, said second housing having an inner side of the exterior of the second housing and an outer side of the exterior of the second housing, said inner side of the second housing facing substantially opposite from said outer side of the second housing, said inner side of the first housing and said inner side of the second housing facing each other and together constituting an inner side of the portable clamshell instrument when said first and second housings are in a folded position, the inner side of the first housing forming an obtuse angle with respect to the inner side of the second housing in the unfolded position;
    a display portion provided in said inner side of said first housing; and
    a camera fixedly provided in said second housing such that an optical axis of the camera may not change with respect to any portion of said second housing; wherein
    said camera is integrated to said second housing such that a perpendicular direction with respect to a display surface of said display portion and an optical axis direction of said camera are substantially parallel when said first housing and said second housing are in an unfolded positions,
    a perpendicular direction with respect to said inner side of the second housing and the optical axis direction of said camera form an acute angle therebetween, and
    when the first housing and the second housing are in the folded position, the display portion is located on said inner side of the portable clamshell device.

7. The portable clamshell instrument with camera according to claim 6, wherein said inner sides of said first housing and said second housing face substantially the same direction when said first housing and said second housing are in the unfolded position.

8. The portable clamshell instrument with camera according to claim 6, wherein
    said camera is integrated in said second housing such that said camera is located on said inner side of the portable clamshell instrument with camera when said first housing and said second housing are in the folded position.

9. The portable clamshell instrument with camera according to claim 6, wherein
said camera is integrated in said second housing such that said camera is located on said outer side of the second housing when said first housing and said second housing are in the folded position.

10. The portable clamshell instrument with camera according to claim 6, further comprising:
a second display portion, located on said outer side of the first housing.

11. The portable clamshell instrument with camera according to claim 6, further comprising:
a plurality of input buttons disposed on said inner side of the second housing and facing the display portion in the folded position.

* * * * *